(12) United States Patent
Le Boulicaut

(10) Patent No.: US 11,293,377 B2
(45) Date of Patent: Apr. 5, 2022

(54) TURBOJET ENGINE NACELLE INCLUDING A CASCADE THRUST REVERSER

(71) Applicant: Safran Nacelles, Gonfreville l'Orcher (FR)

(72) Inventor: Loïc Hervé André Le Boulicaut, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 37 days.

(21) Appl. No.: 16/806,251

(22) Filed: Mar. 2, 2020

(65) Prior Publication Data

US 2020/0284220 A1    Sep. 10, 2020

Related U.S. Application Data

(63) Continuation of application No. PCT/FR2018/052133, filed on Aug. 30, 2018.

(30) Foreign Application Priority Data

Aug. 31, 2017  (FR) ...................................... 1758044

(51) Int. Cl.
*F02K 1/72* (2006.01)
*F02K 1/76* (2006.01)

(52) U.S. Cl.
CPC ................ *F02K 1/72* (2013.01); *F02K 1/763* (2013.01)

(58) Field of Classification Search
CPC ... F02K 1/56; F02K 1/62; F02K 1/625; F02K 1/64; F02K 1/70; F02K 1/72; F02K 1/763
See application file for complete search history.

(56) References Cited

U.S. PATENT DOCUMENTS

| | | | | |
|---|---|---|---|---|
| 3,055,174 A | * | 9/1962 | Grotz | ........................ F02K 1/62 239/265.13 |
| 3,347,467 A | * | 10/1967 | Carl | ...................... F02K 1/1246 239/265.31 |
| 4,458,863 A | * | 7/1984 | Smith | .................... B64D 27/00 239/265.29 |
| 8,800,262 B2 | | 8/2014 | Vauchel et al. | |

(Continued)

FOREIGN PATENT DOCUMENTS

| | | |
|---|---|---|
| DE | 102013206595 | 10/2014 |
| EP | 3193002 | 7/2017 |
| FR | 2966883 | 5/2012 |

OTHER PUBLICATIONS

International Search Report for International Application PCT/FR2018/052133, dated Dec. 17, 2018.

*Primary Examiner* — Gerald L Sung
(74) *Attorney, Agent, or Firm* — Burris Law, PLLC

(57) ABSTRACT

A thrust reverser for a turbojet engine nacelle includes thrust reversal cascade vanes arranged about an annular flow duct having a stationary front casing, at least one movable cover moving backwards into a thrust reversal open position, and tilting flaps connected by rear pivots to the movable cover, which, in an open position, tilt and thereby at least partially close the annular flow duct. The cascade vanes move backwards with the movable cover, in that, in the closed position, the tilting flaps and the cascade vanes are arranged outside the stationary casing, and each tilting flap is connected to the stationary casing by slides which cause the tilting flaps to tilt when the movable cover moves backwards.

20 Claims, 4 Drawing Sheets

(56) References Cited

U.S. PATENT DOCUMENTS

| | | | |
|---|---|---|---|
| 9,376,986 B2* | 6/2016 | Todorovic | F02K 3/025 |
| 9,856,825 B2 | 1/2018 | Gallet | |
| 2004/0195434 A1* | 10/2004 | Parham | F02K 1/70 |
| | | | 244/11 |
| 2010/0212286 A1* | 8/2010 | West | F02K 1/32 |
| | | | 60/226.2 |
| 2013/0205753 A1 | 8/2013 | Todorovic | |
| 2014/0319243 A1* | 10/2014 | Caruel | F02K 1/72 |
| | | | 239/265.19 |
| 2016/0076484 A1* | 3/2016 | Vauchel | F02K 1/72 |
| | | | 239/265.33 |
| 2016/0108852 A1* | 4/2016 | Caruel | F16H 25/2204 |
| | | | 239/265.19 |
| 2016/0153399 A1* | 6/2016 | Sawyers-Abbott | F02K 1/72 |
| | | | 239/1 |
| 2016/0160799 A1 | 6/2016 | Gormley | |
| 2017/0175674 A1* | 6/2017 | Schrell | F02K 1/72 |
| 2017/0198659 A1* | 7/2017 | Gormley | F02K 1/763 |
| 2017/0292474 A1* | 10/2017 | Davies | F02K 1/72 |
| 2017/0328304 A1* | 11/2017 | Gormley | F02K 1/72 |
| 2018/0372024 A1* | 12/2018 | Pautis | F02K 1/763 |
| 2020/0018258 A1* | 1/2020 | Aziz | F02K 1/72 |

* cited by examiner

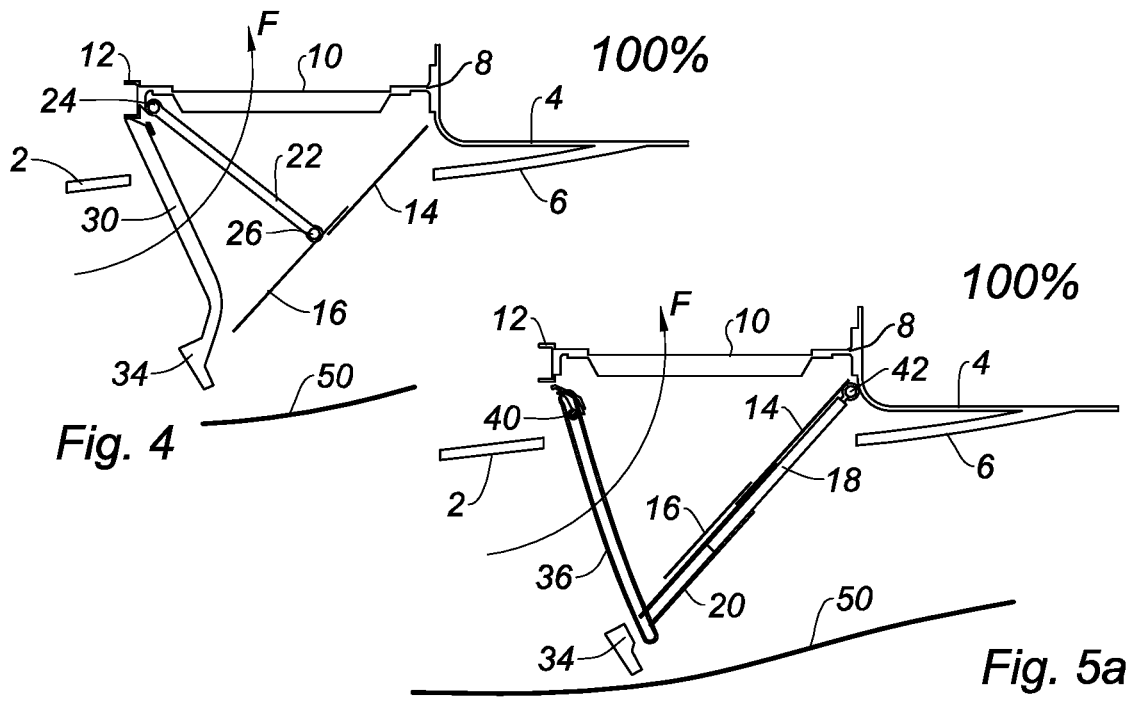
Fig. 4
Fig. 5a
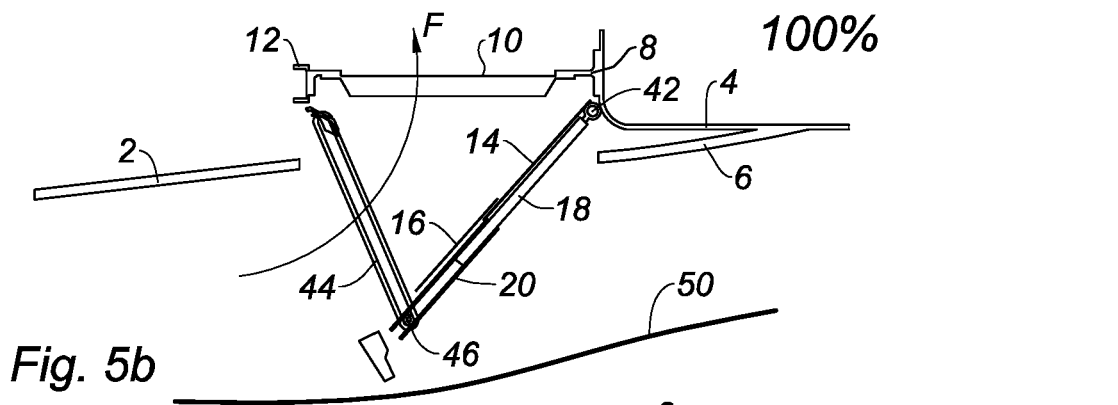
Fig. 5b
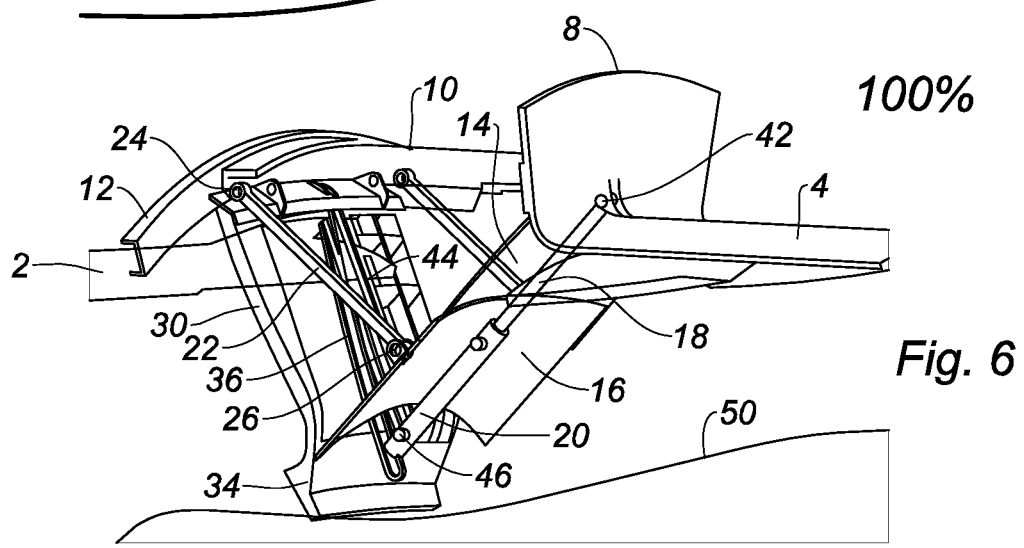
Fig. 6

TURBOJET ENGINE NACELLE INCLUDING A CASCADE THRUST REVERSER

CROSS-REFERENCE TO RELATED APPLICATIONS

This application is a continuation of International Application No. PCT/FR2018/052133, filed on Aug. 30, 2018, which claims priority to and the benefit of FR 17/58044 filed on Aug. 31, 2017. The disclosures of the above applications are incorporated herein by reference.

FIELD

The present disclosure relates to a cascade thrust reverser for a turbojet engine nacelle, as well as a turbojet engine nacelle equipped with such a thrust reverser.

BACKGROUND

The statements in this section merely provide background information related to the present disclosure and may not constitute prior art.

Turbojet engines for propelling aircrafts disposed along a longitudinal axis, inserted in a nacelle, receive fresh air coming from the front side, and reject on the rear side the hot gases from the combustion of the fuel delivering a thrust.

For bypass turbojet engines, fan blades disposed around the engine generate a significant secondary flow of cold air along an annular flow path passing between this engine and the nacelle, which adds a high thrust.

Some nacelles include a thrust reverser system which at least partially closes the annular flow path of cold air, and rejects the secondary flow radially outwards by directing it forwards in order to generate a reverse thrust for braking the aircraft.

A known type of cascade thrust reverser, presented in particular by the document U.S. Patent Publication No. 2016/0160799, includes rear movable cowls sliding axially rearwards by the effect of cylinders, to open lateral air passages on the nacelle containing cascades.

The rear cowls are connected by control tie rods mounted on hinges, describing curves in an axial plane, with thrust reverser cascades driven rearwards, and with flaps for closing the main flow.

The tie rods are disposed to obtain a rearward translation of the cascades which is less significant than that of the cowls, and a tilting of the flaps in the cold air annular flow path which at least partially closes this flow path by directing the flow radially outwards throughout the cascades thereby returning this flow to the front.

Nonetheless, this type of thrust reverser including tie rods disposed below the cascades, describing curves in an axial plane, occupies a relatively large volume below these cascades which does not allow optimizing the aerodynamic shapes of the annular flow path, as well as its lining with soundproofing panels.

SUMMARY

This section provides a general summary of the disclosure and is not a comprehensive disclosure of its full scope or all of its features.

The present disclosure provides a thrust reverser for a turbojet engine nacelle, including thrust reverser cascades disposed around an annular flow path comprising radially outwards a fixed front casing, including at least one movable cowl moving backwards in an open thrust reversal position, and including tilting flaps connected by rear pivots to the movable cowl, which tilt by closing at least partially the annular flow path in the open position, the thrust reverser being remarkable in that the cascades move backwards with the movable cowls, in that, in the closed position, the tilting flaps and the cascades are disposed outside the fixed casing, and in that each tilting flap is connected to the fixed casing by slides which make it tilt during the backward movement of the movable cowl.

An advantage of the thrust reverser is that in the closed position the cascades and the tilting flaps being stored above the fixed casing, the axial length of the nacelle can be very short. In addition, the slide can be stored above the fixed cowl which clears the passage of the annular flow path while limiting the aerodynamic losses.

The thrust reverser according to the present disclosure may also include one or more of the following features, which may be combined together.

Advantageously, in the closed position, the tilting flaps and the cascades are successively disposed in this order outside the fixed casing.

Advantageously, the thrust reverser includes a slides support linked on the front side by a pivot to the cascades, supporting the slides which are fastened above, controlling the opening of a flap.

In this case, the thrust reverser advantageously includes a first slide receiving in a groove a transverse axis linked to the front casing, which controls a tilting of the slides support.

In addition, the thrust reverser advantageously includes a second slide receiving in a groove a transverse finger linked to the flaps, which controls a tilting of the flap. The two grooves form cams allowing easily adjusting the kinematics of the movement of the flap.

Advantageously, the slide support includes on the rear side an annular flow path section, which is in the closed position axially interposed between the front casing and an internal surface of the annular flow path of the movable cowl.

Advantageously, the slides support includes in the open position an internal passage of the flow having edges for deflecting the flow. In this manner, the deflection of the flow radially outwards is improved.

Advantageously, said slides support includes blades allowing directing the air flow from said annular flow path towards said cascades.

Advantageously, each flap includes two half-flaps sliding relative to each other. In the closed position, the flap is thus much more compact.

Advantageously, the thrust reverser includes at least one telescopic rod comprising an internal portion and an external portion each fastened to a half-flap to guide it.

Advantageously, the thrust reverser includes on each side of a flap, at least one connecting rod comprising a pivoting end fastened to the cascades and the other pivoting end fastened to the flap, to guide the flap.

The present disclosure also relates to a turbojet engine nacelle including a cascade thrust reverser, equipped with a thrust reverser comprising any one of the preceding features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a cross-sectional view of a thrust reverser in a fully open position along a cutting plane passing on the side of a cascade according to the present disclosure;

FIG. 5a is a cross-sectional view of a thrust reverser in a fully open position along a cutting plane passing through a curved slide according to the present disclosure;

FIG. 5b is a cross-sectional view of a thrust reverser in a fully open position along a section plane passing through a straight slide according to the present disclosure;

FIG. 6 is a perspective view of a thrust reverser in a fully open position according to the present disclosure;

Figure 1:
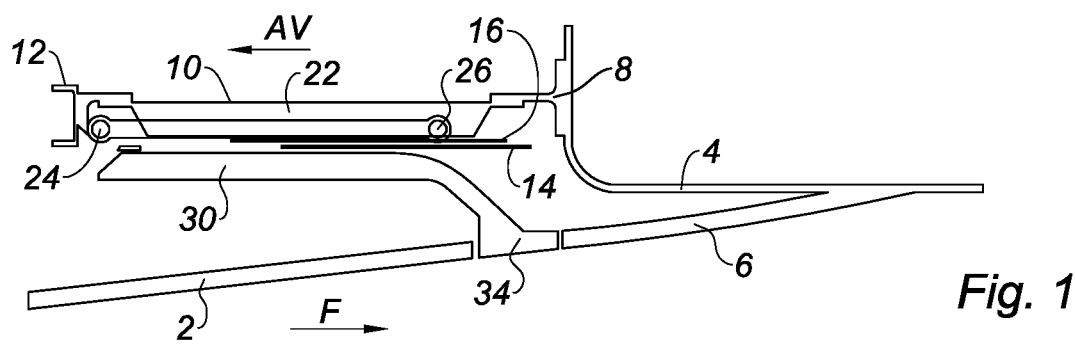
FIG. 1 is a cross-sectional view of a thrust reverser in the closed position along a cutting plane passing on the side of a cascade in accordance with the present disclosure.
Figure 2A:
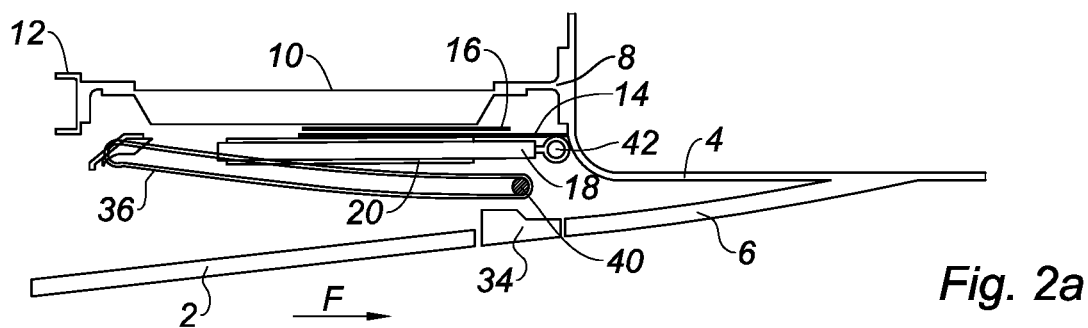
FIG. 2a is a cross-sectional view of a thrust reverser in the closed position along a cutting plane passing through a curved slide according to the present disclosure.
Figure 2B:
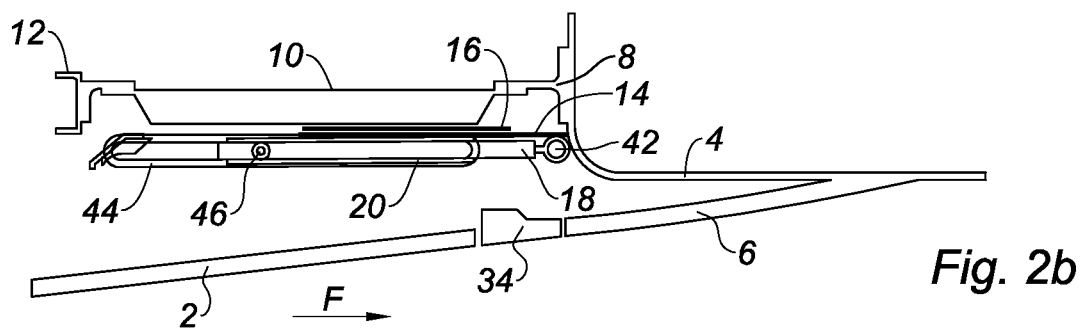
FIG. 2b is a cross-sectional view of a thrust reverser in the closed position along a section plane passing through a straight slide according to the present disclosure.
Figure 3:
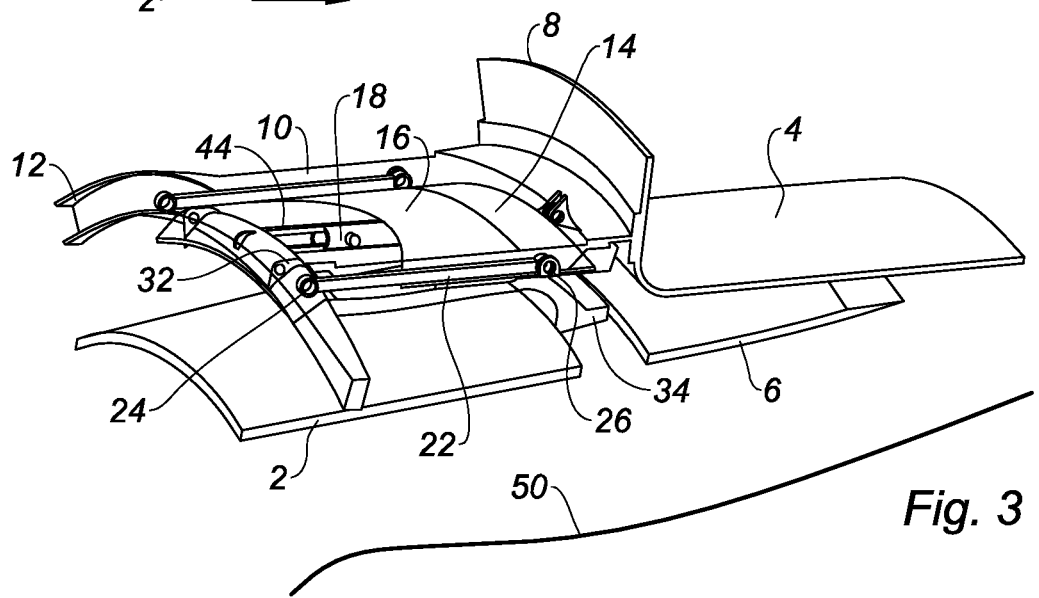
FIG. 3 is a perspective view of a thrust reverser in the closed position according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIGS. 1, 2a, 2b and 3 show a thrust reverser of a nacelle with a main axis having a front side indicated by the arrow AV, corresponding to the direction of travel.

The nacelle includes a cold air annular flow path receiving a flow F, delimited radially outwards by a fixed front casing 2, which extends rearwardly by the internal face 6 of a movable rear cowl 4.

The movable rear cowl 4 includes on the front side, a circular rear frame 8 and a circular front frame 12, receiving flow thrust reverser cascades 10 covering the annular space formed between these two frames.

In the closed position, the rear end of the cascades 10 is substantially aligned on the rear end of the fixed front casing 2, the cascades mostly extend above the front casing.

Movable flaps each comprising a front half-flap 16 and a rear half-flap 14, superimposed one on each other, are disposed flat just below each cascade 10.

A telescopic rod 18 disposed at the middle of each flap, includes an internal portion comprising on the rear side a pivot 42 linked to the movable cowl 4 (and more specifically to the rear frame 8 in the example), which is fastened to the rear half-flap 14, and an external portion 20 sliding around the internal portion, which is fastened to the front half-flap 16. In this manner, an extension of the telescopic rod 18 performs a sliding of the two half-flaps 14, 16 on each other.

On each side of the cascades 10, a connecting rod 22 includes a front pivot 24 fastened to the front frame 12, and a rear pivot 26 fastened on the side of the front half-flap 16.

A slides support 30 forming a tray disposed below each cascade 10, includes at its front end a pivot 32 fastened to the front frame 12, and at the rear an annular flow path section 34, having a small axial length which is adjusted between the front casing 2 and the internal face 6 of the rear cowl 4 so as to provide an aerodynamic surface continuity therebetween.

Complementarily, sealing gaskets may be disposed between the annular flow path section 34, and on one side the front casing 2, and on the other side the internal face 6 of the rear cowl 4, to provide in the closed position of the thrust reverser sealing of the flow avoiding air passages radially outwards of the annular flow path.

Complementarily, an acoustic attenuation material may be added on the annular flow path section 34, so as to contribute to absorbing acoustic vibrations in the annular flow path, and to reduce sound emissions.

A first slide connection is formed for example by one single straight slide 44 having an elongated flat shape, and in one form is disposed in an axial plane at the middle of each flap, between the flap and the front casing 2. The straight slide includes a front end fastened to the front of the slides support 30 and a straight internal groove substantially parallel to the main axis of the nacelle. The front end of the external portion 20 of the telescopic rod 18 includes a transverse finger 46 engaged in the straight groove.

A second slide connection is formed for example by a curved slide 36 having an elongated flat shape, and in one form, disposed parallel to the straight slide 44, also including its front end fastened to the front of the slides support 30.

The curved slide 36 includes an internal groove substantially parallel to the main axis of the nacelle, having a slight curvature turned towards the main axis. A transverse axis 40 connected to the fixed front casing 2, disposed slightly behind and above the rear end of the front casing, is adjusted in the closed position behind the curved groove of the curved slide 36.

In the closed position, the radially external surface of the annular flow path has a proper aerodynamic continuity with the annular flow path section 34 providing the continuity between the front casing 2 and the internal face 6 of the rear cowl 4. Accordingly, no mechanism disturbs the flow of the fluid in the flow path.

The thrust reverser is concentrated outside the front casing 2, by forming a flat assembly adjusted between the casing and the cascades 10 disposed outside. It almost does not extend from the rear of the front casing 2, which allows the rear cowl 4 to be very advanced.

FIGS. 4, 5a, 5b and 6 show the open thrust reverser, the rear cowl 4 having moved backwards by the effect of a motor-drive by driving the cascades 10 and the half-flaps 14, 16.

The backward movement of the curved slide 36 fastened to the front frame 12, causes a sliding of the transverse axis 40 in its groove. The front pivot axis of the curved slide 36 positioned above the transverse axis 40, implies a downward tilting of the curved slide, which causes in a similar manner the downward tilting of the slides support 30.

The straight slide 44 having a similar downward tilting movement drives the front transverse finger 46 of the telescopic rod 18, which is deployed by imparting a similar movement to the front half-flap 16 and the rear half-flap 14, fastened respectively to the external portion 20 and to the internal portion 18 of the telescopic rod 18.

A deployment of the flaps is obtained with the annular section 34 coming in the vicinity of the radially internal surface 50 of the annular flow path, these flaps mostly closing the annular flow path. The flow is deflected by the flaps radially outwards, to pass throughout the cascades 10 which direct the flow forwards while generating the braking thrust.

The connecting rods 22 disposed on each side of the flaps achieve by their rear pivot 26 a guidance of the front half-flaps 16.

Two connecting rods 22 are used in one form of the present disclosure, but the system could also operate with one single connecting rod.

Alternatively, the slides support 30 may have different shapes. It may in particular include fins imparting a first direction of the flow radially outwards.

Figure 7:
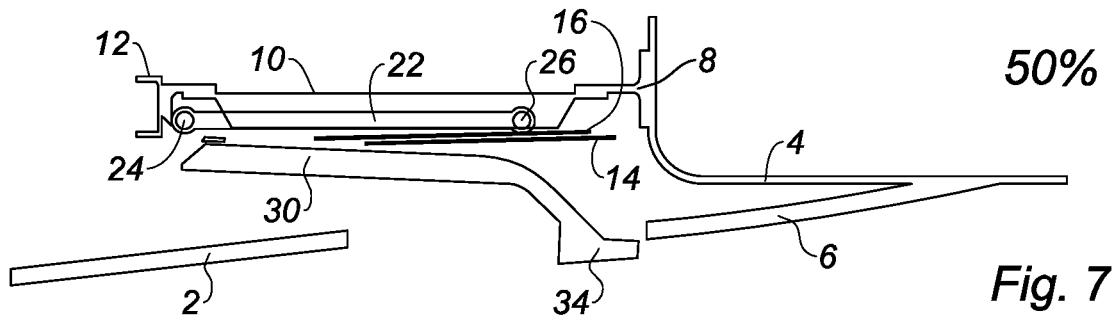
FIG. 7 is a cross-sectional view of a thrust reverser along a cutting plane passing on the side of a cascade, the thrust reverser open to 50% according to the present disclosure.
Figure 8:
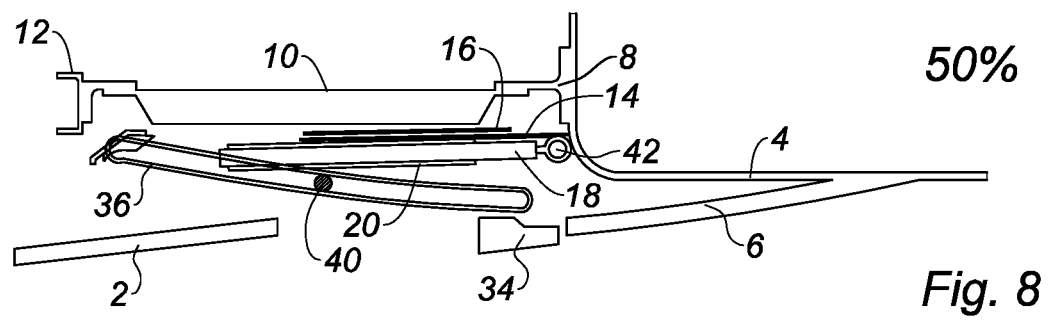
FIG. 8 is a cross-sectional view of a thrust reverser along a cutting plane passing through a curved slide, the thrust reverser open to 50% according to the present disclosure.

FIGS. 7 and 8 show a backward movement of the movable rear cowl 4 equal to 50% of the total stroke. The transverse axis 40 is quite away from the front pivot of the slides support 30, the support has tilted very little.

The annular flow path section 34 has moved backwards with the rear cowl 4, but remains close to the internal face 6 of the cowl. The curved slide 36 as well as the straight slide 44 have, like the slides support 30, very slightly tilted, the half-flaps 14, 16 remain close to the cascades 10.

Figure 9:
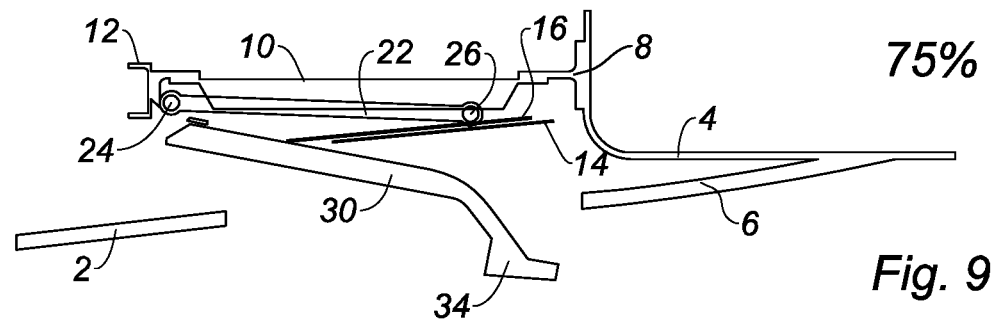
FIG. 9 is a cross-sectional view of a thrust reverser along a cutting plane passing on the side of a cascade, the thrust reverser open to 75% according to the present disclosure.
Figure 10:
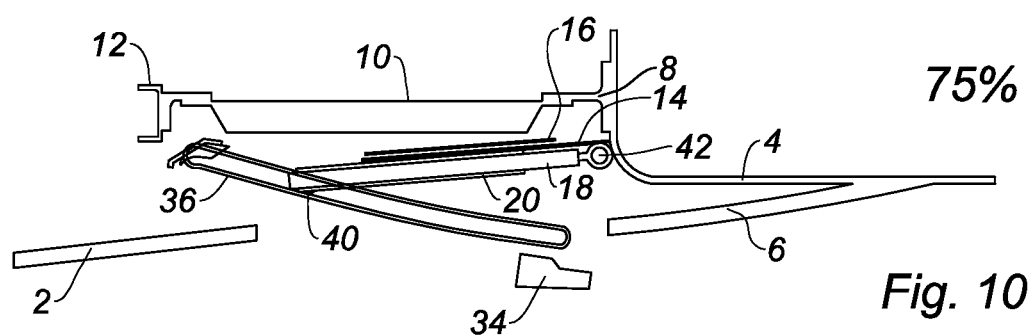
FIG. 10 is a cross-sectional view of a thrust reverser along a cutting plane passing through a curved slide, the thrust reverser open to 75% according to the present disclosure.

FIGS. 9 and 10 show a more significant backward movement of the movable rear cowl 4, equal to 75% of the total stroke. Under the effect of the transverse axis 40 which gets close to the front pivot of the slides support 30, the support has tilted a little more while following the backward movement of the rear cowl.

The curved slide 36 and the straight slide 44 tilt in a similar manner, but the straight shape of the straight slide causes a slight lowering of the transverse finger 46 linked to the telescopic rod 18. The half-flaps 14, 16 have barely tilted.

Figure 11:
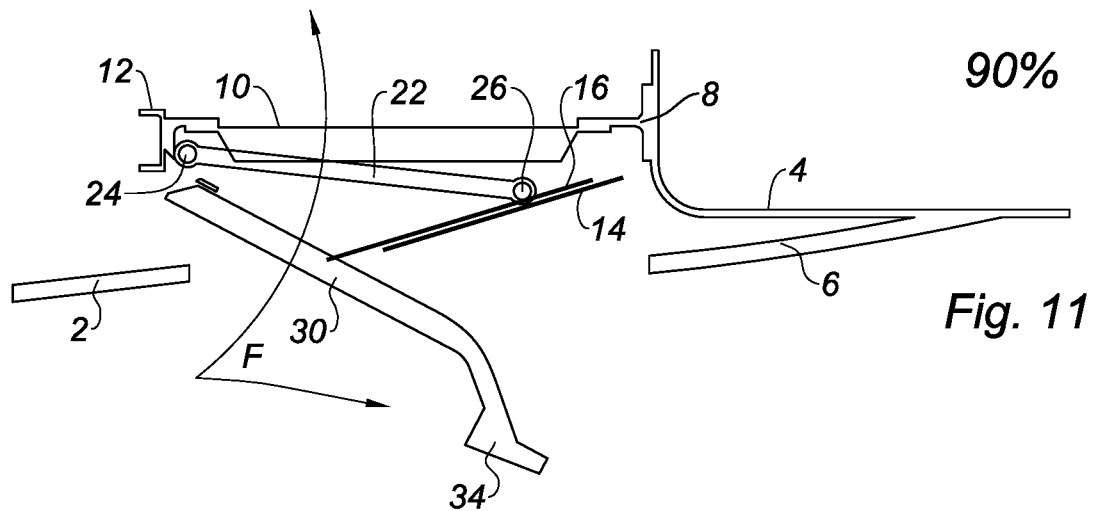
FIG. 11 is a cross-sectional view of a thrust reverser along a cutting plane passing on the side of a cascade, the thrust reverser open to 90% according to the present disclosure.
Figure 12:
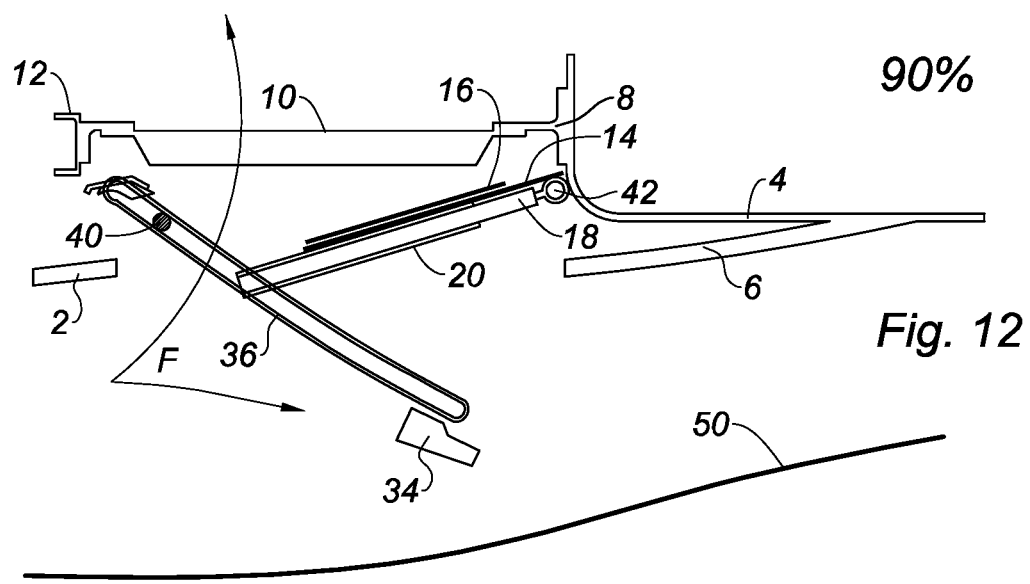
FIG. 12 is a cross-sectional view of a thrust reverser along a cutting plane passing through a curved slide, the thrust reverser open to 90% according to the present disclosure.

FIGS. 11 and 12 show a more significant backward movement of the movable rear cowl 4, equal to 90% of the total stroke. Under the effect of the transverse axis 40 which arrives near the front pivot of the slides support 30, the support has considerably tilted.

The curved slide 36 and the straight slide 44 tilt in a similar manner. The straight shape of the straight slide 44 causes a more significant lowering of the transverse finger 46 linked to the telescopic rod 18. The half-flaps 14, 16 tilt considerably.

Thanks to the particular shape of the curved slide 36 and of the straight slide 44, a significant tilting movement of the flaps is obtained only at the end of the backward movement of the rear cowl 4. In particular, the kinematics of these flaps can be easily adjusted by modifying these curved and straight shapes.

Figure 13:
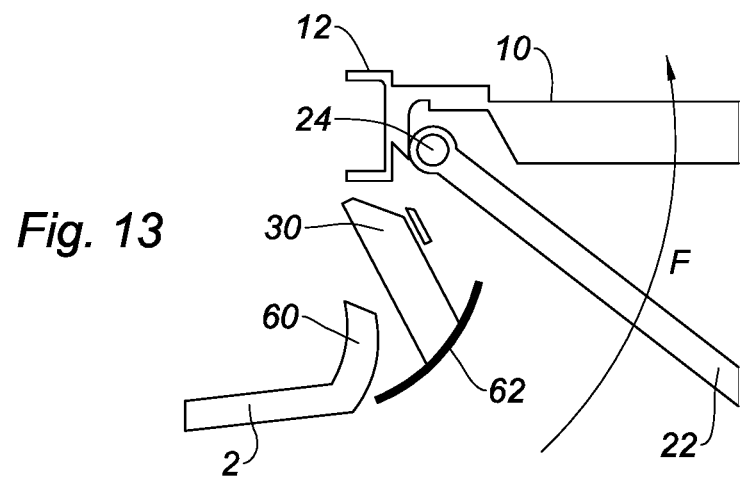
FIG. 13 shows a variant of the thrust reverser according to the present disclosure.

FIG. 13 shows the rear end of the front casing 2 including a deflection fixed rear edge 60 turned radially outwards, which assists in guiding the flow radially outwards in the open position of the thrust reverser.

The slides support 30 also includes in its internal passage of the flow, a deflection movable edge 62 having a shape curved towards the axis of the nacelle, which also assists in guiding the flow radially outwards in the open position.

Complementarily, the slides support 30 may include blades or fins that direct the flow F from the annular flow path towards the cascades 10 in an appropriate manner.

Of course, the present disclosure is in no way limited to the described and represented forms.

Thus, for example, the straight slide 44 could be replaced by a rack cooperating with the front transverse finger 46 of the telescopic rod 18.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A turbojet engine nacelle comprising:
a thrust reverser including thrust reverser cascades disposed around an annular flow path comprising a fixed front casing extending radially outwards;
at least one movable cowl operable to move backwards towards an open thrust reversal position;
tilting flaps connected by at least one rear pivot to the at least one movable cowl, which tilt by closing at least partially the annular flow path in the open thrust reversal position, wherein the thrust reverser cascades move backwards with the at least one movable cowl, the tilting flaps and the thrust reverser cascades are disposed outside the fixed front casing in a closed position, and each tilting flap is connected to the fixed front casing by slides which cause each tilting flap to tilt during the backward movement of the at least one movable cowl; and
a slides support having a front side pivotably mounted to the thrust reverser cascades, wherein the slides are fastened to the slides support, a pivoting motion of the slides support controlling opening of the tilting flaps; and
at least one connecting rod comprising a pivoting end fastened to the thrust reverser cascades and another pivoting end fastened to the tilting flaps.

2. The turbojet engine nacelle according to claim 1, wherein in the closed position, the tilting flaps and the thrust reverser cascades are successively disposed outside the fixed front casing.

3. The turbojet engine nacelle according to claim 1, wherein the slides further comprise a first slide having a first groove that receives a transverse axis, the transverse axis being linked to the fixed front casing and controlling the tilting motion of the slides support.

4. The turbojet engine nacelle according to claim 3, wherein the slides further comprise a second slide having a second groove that receives a transverse finger, the transverse finger being linked to the tilting flaps and controlling the tilting motion of the tilting flaps.

5. The turbojet engine nacelle according to claim 1, wherein the slides support includes blades that directs an air flow from the annular flow path towards the thrust reverser cascades.

6. The turbojet engine nacelle according to claim 1, wherein each tilting flap includes two half-flaps sliding relative to each other.

7. The turbojet engine nacelle according to claim 6 further comprising at least one telescopic rod comprising an internal portion and an external portion, each of the internal portion and the external portion fastened to a half-flap.

8. A turbojet engine nacelle comprising:
a thrust reverser including thrust reverser cascades disposed around an annular flow path comprising a fixed front casing extending radially outwards;
at least one movable cowl operable to move backwards towards an open thrust reversal position;
tilting flaps connected by at least one rear pivot to the at least one movable cowl, which tilt by closing at least partially the annular flow path in the open thrust reversal position, wherein the thrust reverser cascades move backwards with the at least one movable cowl, the tilting flaps and the thrust reverser cascades are disposed outside the fixed front casing in a closed position, and each tilting flap is connected to the fixed front casing by slides which cause each tilting flap to tilt during the backward movement of the at least one movable cowl; and
a slides support having a front side pivotably mounted to the thrust reverser cascades, wherein the slides are fastened to the slides support, a pivoting motion of the slides support controlling opening of the tilting flaps,
wherein the slide support includes, on a rear side, an annular flow path section, which is in the closed position axially interposed between the fixed front casing and an internal surface of the annular flow path of the at least one movable cowl.

9. The turbojet engine nacelle according to claim 8, wherein in the closed position, the tilting flaps and the thrust reverser cascades are successively disposed outside the fixed front casing.

10. The turbojet engine nacelle according to claim 8, wherein the slides further comprise a first slide having a first groove that receives a transverse axis, the transverse axis being linked to the fixed front casing and controlling the tilting motion of the slides support.

11. The turbojet engine nacelle according to claim 10, wherein the slides further comprise a second slide having a second groove that receives a transverse finger, the transverse finger being linked to the tilting flaps and controlling the tilting motion of the tilting flaps.

12. The turbojet engine nacelle according to claim 8, wherein the slides support includes blades that directs an air flow from the annular flow path towards the thrust reverser cascades.

13. The turbojet engine nacelle according to claim 8, wherein each tilting flap includes two half-flaps sliding relative to each other.

14. The turbojet engine nacelle according to claim 13 further comprising at least one telescopic rod comprising an internal portion and an external portion, each of the internal portion and the external portion fastened to a half-flap.

15. A turbojet engine nacelle comprising:
a thrust reverser including thrust reverser cascades disposed around an annular flow path comprising a fixed front casing extending radially outwards;
at least one movable cowl operable to move backwards towards an open thrust reversal position;
tilting flaps connected by at least one rear pivot to the at least one movable cowl, which tilt by closing at least partially the annular flow path in the open thrust reversal position, wherein the thrust reverser cascades move backwards with the at least one movable cowl, the tilting flaps and the thrust reverser cascades are disposed outside the fixed front casing in a closed position, and each tilting flap is connected to the fixed front casing by slides which cause each tilting flap to tilt during the backward movement of the at least one movable cowl; and
a slides support having a front side pivotably mounted to the thrust reverser cascades, wherein the slides are fastened to the slides support, a pivoting motion of the slides support controlling opening of the tilting flaps,
wherein the slides support includes, in the open thrust reversal position, an internal passage having edges for deflecting an air flow.

16. The turbojet engine nacelle according to claim 15, wherein in the closed position, the tilting flaps and the thrust reverser cascades are successively disposed outside the fixed front casing.

17. The turbojet engine nacelle according to claim 15, wherein the slides further comprise a first slide having a first groove that receives a transverse axis, the transverse axis being linked to the fixed front casing and controlling the tilting motion of the slides support.

18. The turbojet engine nacelle according to claim 15, wherein the slides support includes blades that directs an air flow from the annular flow path towards the thrust reverser cascades.

19. The turbojet engine nacelle according to claim 15, wherein each tilting flap includes two half-flaps sliding relative to each other.

20. The turbojet engine nacelle according to claim 15 further comprising at least one telescopic rod comprising an internal portion and an external portion, each of the internal portion and the external portion fastened to a half-flap.

* * * * *